United States Patent
Ogusu et al.

(10) Patent No.: US 10,005,107 B2
(45) Date of Patent: Jun. 26, 2018

(54) WORKPIECE SORTING SYSTEM AND METHOD

(71) Applicant: FANUC CORPORATION, Yamanashi (JP)

(72) Inventors: Kouta Ogusu, Yamanashi (JP); Masaaki Sasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/643,582

(22) Filed: Jul. 7, 2017

(65) Prior Publication Data

US 2018/0056335 A1 Mar. 1, 2018

(30) Foreign Application Priority Data

Aug. 30, 2016 (JP) .................................. 2016-168371

(51) Int. Cl.
*B07C 5/00* (2006.01)
*B07C 5/36* (2006.01)
*B07C 5/10* (2006.01)
*B07C 5/16* (2006.01)
*B07C 5/38* (2006.01)
*B65G 47/90* (2006.01)

(52) U.S. Cl.
CPC ................ *B07C 5/362* (2013.01); *B07C 5/10* (2013.01); *B07C 5/16* (2013.01); *B07C 5/38* (2013.01); *B65G 47/902* (2013.01); *B07C 2501/0063* (2013.01); *B65G 2203/0258* (2013.01); *B65G 2203/041* (2013.01)

(58) Field of Classification Search
CPC .... B07C 5/10; B07C 5/16; B07C 5/38; B07C 5/362

USPC .......................................... 209/552, 555, 938
See application file for complete search history.

(56) References Cited

U.S. PATENT DOCUMENTS 4,805,778 A * 2/1989 Nambu .................. A01K 43/00
   209/3.3
5,275,295 A * 1/1994 Eisenlohr .............. B07C 5/3412
   209/536

(Continued)

FOREIGN PATENT DOCUMENTS

| JP | H08-63214 A | 3/1996 |
|---|---|---|
| JP | 2003-211096 A | 7/2003 |
| JP | 2010-6590 A | 1/2010 |

*Primary Examiner* — Terrell Howard Matthews
(74) *Attorney, Agent, or Firm* — Maier & Maier, PLLC

(57) ABSTRACT

Provided is a sort workpiece sorting system including: a conveyor; a conveying position detection part for workpieces; a camera configured to photograph the workpieces; robots provided with a hand disposed along a conveying direction and capable of ejecting workpieces on the conveyor, and a weight measurement part; a control part configured to control each robot; and a large group classifying part configured to classify the workpieces into large groups allocated to the robots based on an image of the workpieces. The control part includes a visual tracking part configured to cause the robots to handle the workpieces while following an operation of the conveyor based on the image of the workpieces and a conveying position. The visual tracking part causes the visual tracking part to eject the classified workpieces are ejected from the conveyor by the hand, and the workpieces are sorted for each group based on the measured weight.

9 Claims, 6 Drawing Sheets

(56) References Cited

U.S. PATENT DOCUMENTS

| | | | | |
|---|---|---|---|---|
| 5,727,132 | A | 3/1998 | Arimatsu et al. | |
| 8,373,081 | B2 * | 2/2013 | Ackley | B07C 5/3422 |
| | | | | 209/580 |
| 8,559,699 | B2 * | 10/2013 | Boca | B25J 9/1679 |
| | | | | 382/153 |
| 8,688,264 | B2 * | 4/2014 | Nignon | B07C 5/28 |
| | | | | 700/223 |
| 8,958,912 | B2 * | 2/2015 | Blumberg | B25J 9/0087 |
| | | | | 700/259 |
| 2007/0179671 | A1 * | 8/2007 | Arimatsu | G05B 19/4182 |
| | | | | 700/247 |
| 2013/0062263 | A1 * | 3/2013 | Nakano | B65G 47/647 |
| | | | | 209/552 |
| 2014/0046471 | A1 * | 2/2014 | Bamford | G05B 19/048 |
| | | | | 700/110 |
| 2017/0075331 | A1 * | 3/2017 | Kapoor | G05B 19/0426 |

* cited by examiner

| LARGE GROUP | SMALL GROUP | WEIGHT M [g] | AREA S [mm$^2$] |
|---|---|---|---|
| LARGE | 3L | $a5 \leqq M$ | $b5 \leqq S$ |
| | 2L | $a4 \leqq M < a5$ | $b4 \leqq S < b5$ |
| MEDIUM | L | $a3 \leqq M < a4$ | $b3 \leqq S < b4$ |
| | M | $a2 \leqq M < a3$ | $b2 \leqq S < b3$ |
| SMALL | S | $a1 \leqq M < a2$ | $b1 \leqq S < b2$ |
| | SS | $M < a1$ | $S < b1$ |

WORKPIECE SORTING SYSTEM AND METHOD

CROSS-REFERENCE TO RELATED APPLICATIONS

This application claims the benefit of Japanese Patent Application No. 2016-168371, the content of which is incorporated herein by reference.

TECHNICAL FIELD

The present invention relates to a workpiece sorting system and method.

BACKGROUND ART

A sorting device is conventionally known in which an image of each workpiece conveyed by a conveyor is captured; the type of the workpiece is identified based on the captured image; and the workpiece is picked up from the conveyor by a robot arm and is transferred to areas partitioned for each type of workpieces (refer to PTL 1, for example).

CITATION LIST

Patent Literature

{PTL 1}
Japanese Unexamined Patent Application, Publication No. 2003-211096

SUMMARY OF INVENTION

According to one aspect of the present invention, provided is a workpiece sorting system including: a conveyor configured to randomly convey various types of workpieces having different weights; a conveying position detection part configured to detect a conveying position of each of the workpieces conveyed by the conveyor; a camera configured to photograph the workpieces conveyed by the conveyor; a plurality of robots disposed along a conveying direction of the conveyor, each of the robots being provided with a hand capable of ejecting the workpieces on the conveyor and a weight measurement part configured to measure a weight of each of the workpieces ejected by the hand; a control part configured to control each of the robots; and a large group classifying part configured to classify the workpieces into two or more large groups based on an image of the workpieces captured by the camera, the large groups being allocated to the robots. The control part includes a visual tracking part configured to cause each of the robots to handle the workpieces, while causing each of the robots to follow an operation of the conveyor, based on the image of the workpieces captured by the camera and the conveying position of each of the workpieces detected by the conveying position detection part. The control part controls the visual tracking part to cause the workpieces classified into the large groups allocated to the robots to be ejected from the conveyor by the hand, and controls so that, based on the weight measured by the weight measurement part, the workpieces are sorted for each of small groups respectively included in the large groups.

According to another aspect of the present invention, provided is a workpiece sorting method including the steps of: photographing various types of workpieces having different weights, the workpieces being randomly conveyed by a conveyor; classifying the workpieces into two or more large groups based on an image of the workpieces captured by photographing; measuring a weight of each of the workpieces by causing a plurality of robots disposed along a conveying direction of the conveyor to eject the workpieces classified into the large groups allocated to the respective robots, while causing the robots to follow an operation of the conveyer based on the images and a conveying position of the conveyor; and causing each of the robots to sort the workpieces for each small group included in the large group allocated to the robot, based on the measured weight.

DESCRIPTION OF EMBODIMENTS

A workpiece sorting system 1 and a workpiece sorting method according to one embodiment of the present invention will be described below with reference to the drawings.

Figure 1:
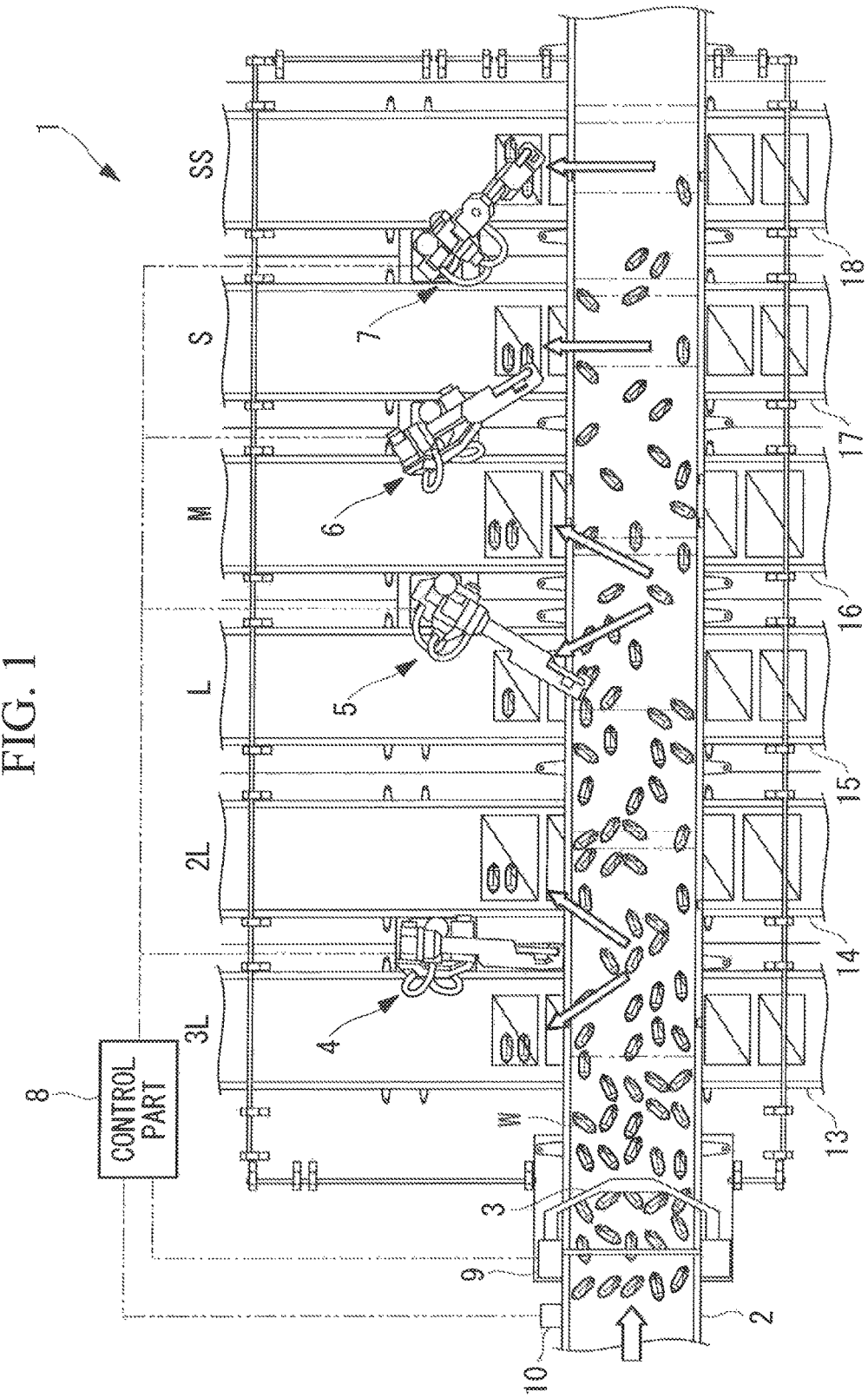
FIG. 1 is an overall structural diagram illustrating a workpiece sorting system according to one embodiment of the present invention.

As illustrated in FIG. 1, the workpiece sorting system 1 according to this embodiment includes a workpiece conveying conveyor (conveyor) 2 that conveys workpieces W in one direction; a camera 3 that photographs the workpieces W conveyed on the workpiece conveying conveyor 2; a plurality of robots 4, 5, 6, and 7 which are arranged at intervals in a conveying direction of the workpieces W by the workpiece conveying conveyor 2; a control part 8 that controls the robots 4, 5, 6, and 7; and a large group classifying part 9 that classifies the workpieces W into a plurality of large groups based on the image captured by the camera 3.

The workpiece conveying conveyor 2 includes an encoder (conveying position detection part) 10 that detects the conveying position of each workpiece W by the workpiece conveying conveyor 2.

The camera 3 is disposed at an upstream side of the workpiece conveying conveyor 2 and is configured to capture an image within the range of the overall width of the workpiece conveying conveyor 2 at a predetermined frame rate.

Figure 2:
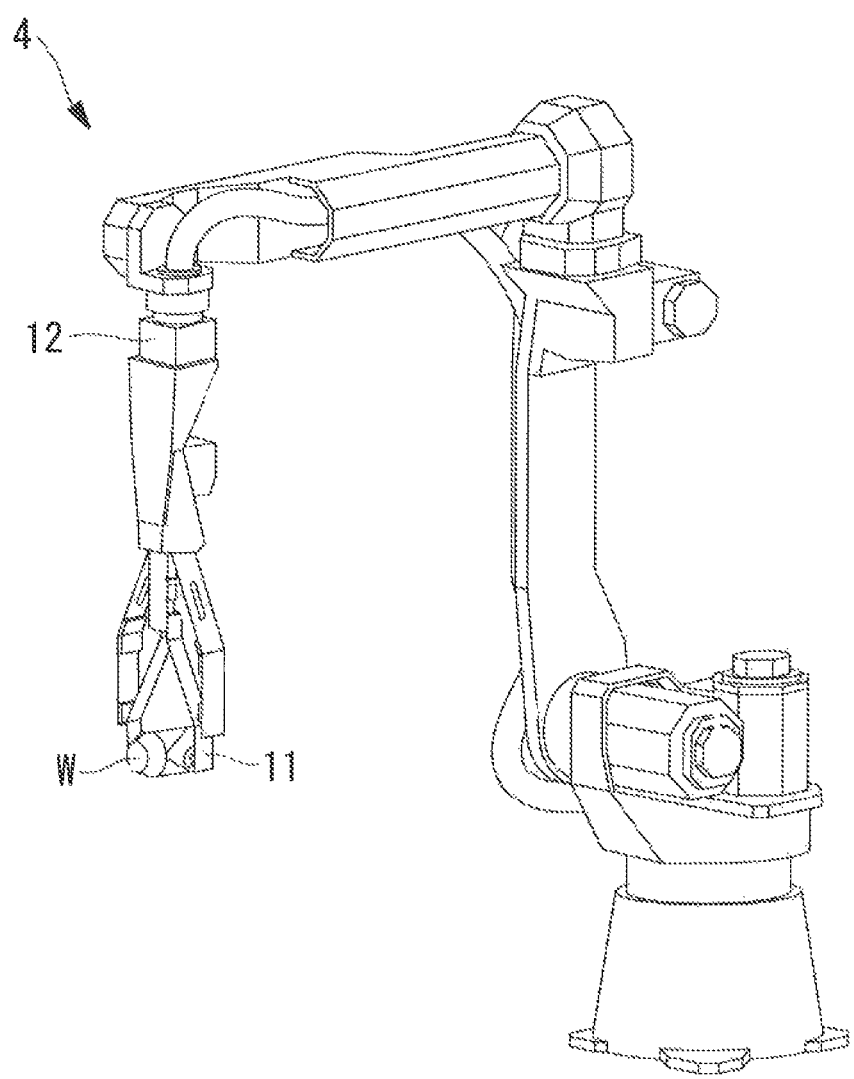
FIG. 2 is a perspective view illustrating an example of a robot included in the workpiece sorting system illustrated in FIG. 1.

As illustrated in FIG. 2, the robots 4, 5, 6, and 7 are, for example, general-purpose six-axis articulated type robots. Each of the robots includes a hand 11 that is formed at a tip of an arm thereof to handle the workpieces W, and a weight scale (weight measurement part) 12 that measures the weight of each workpiece W gripped by the hand 11. The weight of each workpiece W can be measured only by slightly lifting the workpiece W in a state where the workpiece W is gripped by the hand 11. FIG. 2 illustrates the robot 4 by way of example.

The control part 8 includes a visual tracking part (not shown) that causes the robots 4, 5, 6, and 7 to handle each workpiece W conveyed by the workpiece conveying conveyor 2, while causing the robots 4, 5, 6, and 7 to follow an operation of the workpiece conveying conveyor 2, based on the image captured by the camera 3 and information about the conveying position output from the encoder 10 of the workpiece conveying conveyor 2.

Specifically, based on the image captured by the camera 3, coordinates of a predetermined position (for example, the center of gravity) of each workpiece W on the workpiece conveying conveyor 2 with respect to a reference position on the workpiece conveying conveyor 2 at the moment can be obtained. By the operation of the workpiece conveying conveyor 2, each workpiece W is moved in the conveying direction while the reference position on the workpiece conveying conveyor 2 and the coordinates of each workpieces W are maintained. Accordingly, the coordinates of each workpiece W at each point can be accurately calculated based on the information about the conveying position from the encoder 10.

The large group classifying part 9 extracts contour features of each workpiece W in the image captured by the camera 3, and classifies the workpieces W into large groups that are associated with the extracted contour features in advance.

Figures 3, 4:
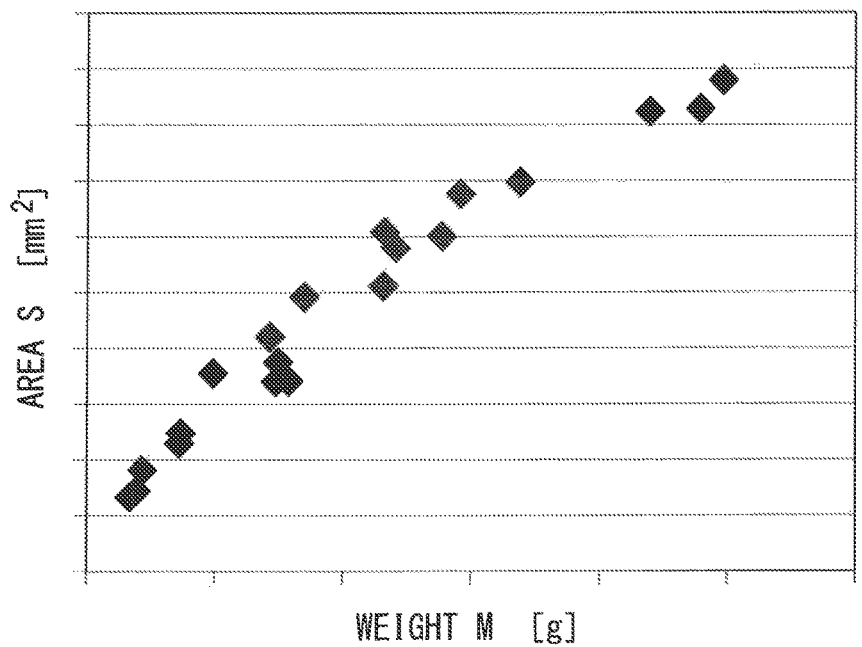
FIG. 3 is a graph illustrating a relationship between an area and a weight in an example of a workpiece sorted by the workpiece sorting system illustrated in FIG. 1.
FIG. 4 is a diagram illustrating an example of a relationship among a large group, a small group, a weight, and an area for sorting workpieces illustrated in FIG. 3.

In this embodiment, when the workpieces W are, for example, agricultural products such as sweet potatoes, as illustrated in FIG. 3, the weight of each workpiece can be roughly estimated according to the area of each workpiece W on the image. Accordingly, in this embodiment, the large group classifying part 9 classifies all the workpieces W into three large groups, i.e., "large", "medium", and "small", according to the area of each workpiece, as illustrated in FIG. 4.

As the contour features, not only the area of each workpiece, but also a perimeter, a major-axis length, a minor-axis length, an aspect ratio, or a combination thereof may be used.

In the example illustrated in FIG. 4, the "large" large group includes two small groups of "3L" and "2L". The "medium" large group includes two small groups of "L" and "M". The "small" large group includes two small groups of "S" and "SS".

As illustrated in FIG. 1, the workpiece sorting system 1 according to this embodiment includes four robots 4, 5, 6, and 7 which are disposed at intervals in the conveying direction of the workpieces W by the workpiece conveying conveyor 2. The three robots 4, 5, and 6 located upstream are each provided with sorting destination conveyors (carrying-out destination) 13, 14, 15, 16, and 17 that are provided at both sides of each robot. The second and third robots 5 and 6 counted from the most upstream side share the sorting destination conveyor 16 which is disposed between the robots 5 and 6. The robot 7 that is located most downstream is provided with one sorting destination conveyor 18 disposed only one side of the robot.

The "large" large group is allocated to the robot 4 that is located most upstream, and the two sorting destination conveyors 13 and 14 located at both sides of the robot 4 correspond to the sorting destinations of the workpieces W for the two small groups "3L" and "2L".

The "medium" large group is allocated to the second robot 5 counted from the most upstream side, and the two sorting destination conveyors 15 and 16 located at both sides of the robot 5 correspond to the sorting destinations of the workpieces W for the two small groups "L" and "M".

The "medium" and "small" large groups are allocated to the third robot 6 counted from the most upstream side, and the sorting destination conveyors 16 and 17 located at both sides of the robot 6 correspond to the sorting destinations of the workpieces W for the two small groups "M" and "S".

The "small" large group is allocated to the robot 7 that is located most downstream, and the sorting destination conveyor 18 that is located most downstream corresponds to the sorting destination of the workpieces W for the small group "SS".

In this embodiment, the most downstream robot 7 is not provided with the weight scale 12.

A workpiece sorting method using the workpiece sorting system 1 according to this embodiment having a configuration as described above will be described below.

Figure 6:
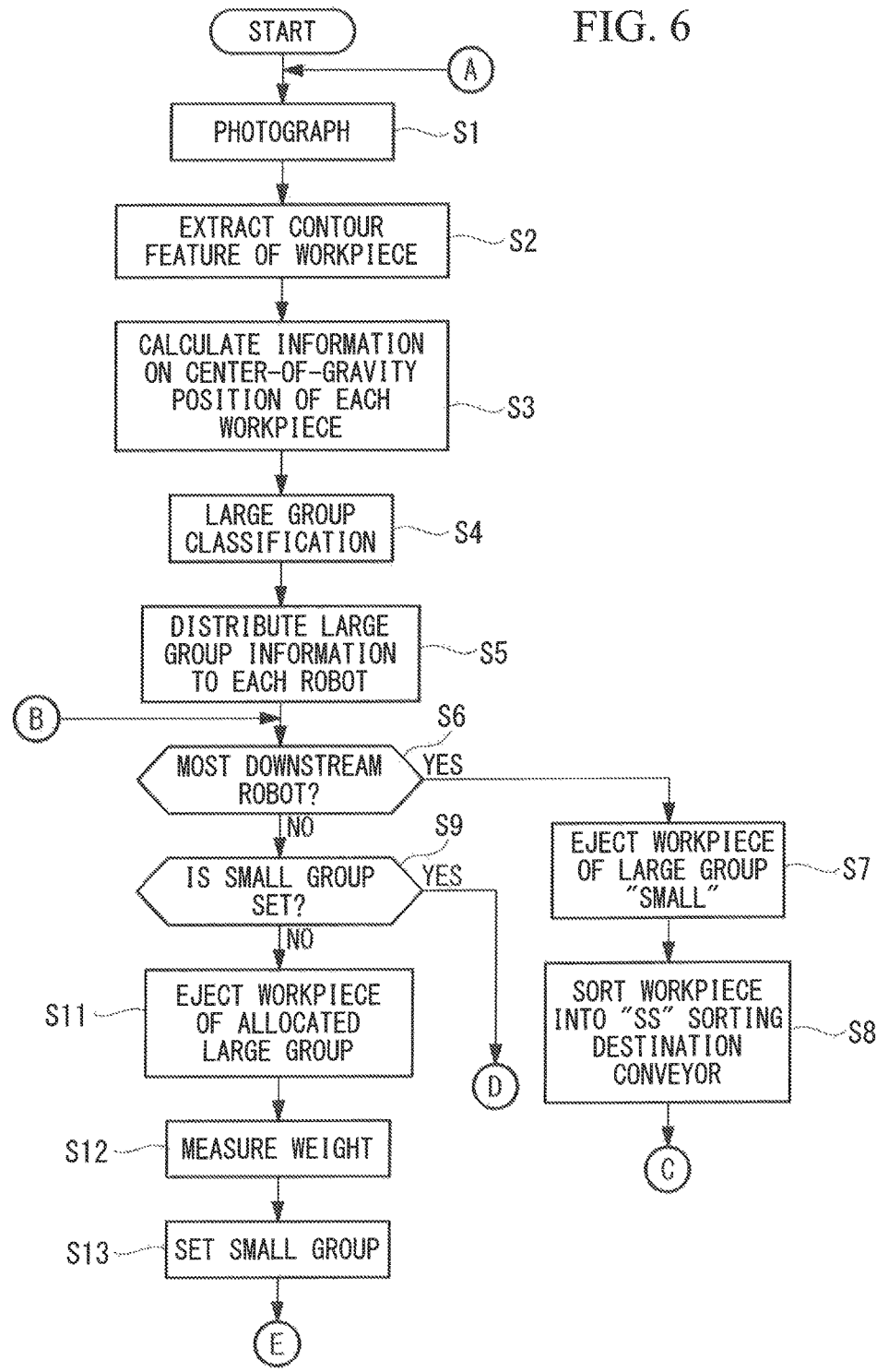
FIG. 6 is a part of a flowchart illustrating a workpiece sorting method using the workpiece sorting system illustrated in FIG. 1.

In the workpiece sorting method according to this embodiment, when various types of workpieces W having different weights are randomly conveyed by the workpiece conveying conveyor 2, as illustrated in FIG. 6, the image of each workpiece W on the workpiece conveying conveyor 2 is captured by the camera 3 that is disposed at the most upstream side of the workpiece conveying conveyor 2 (step S1), and the contour features of each workpiece W are extracted from the captured image (step S2).

Figure 5:
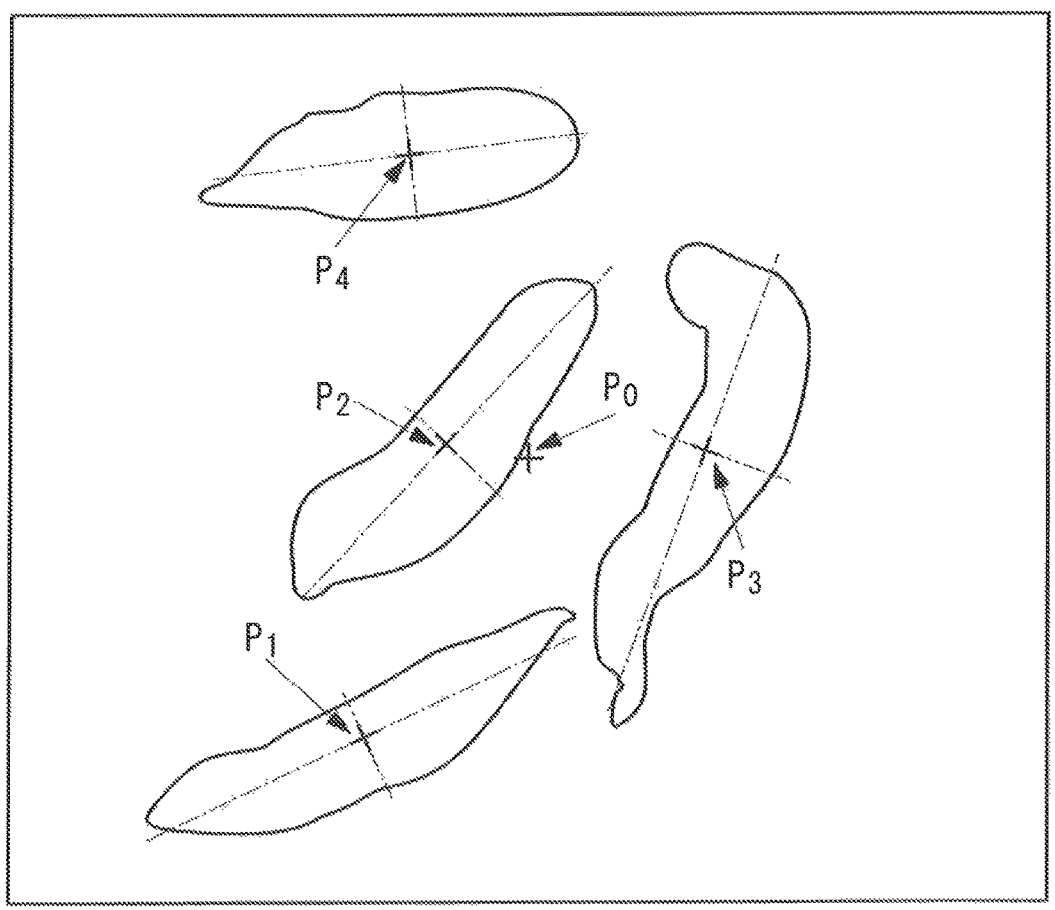
FIG. 5 is a diagram illustrating an example of calculation of a position of center of gravity of each workpiece in an image captured by a camera of the workpiece sorting system illustrated in FIG. 1.

Further, as illustrated in FIG. 5, positions of center of gravity $P_1$, $P_2$, $P_3$, $P_4$, . . . of the workpieces W based on a reference position (for example, a central position) $P_0$ of the image are calculated from the contour features of each workpiece W (step S3).

Further, all the workpieces W are classified into three large groups based on the area of each workpiece W on the image that is one of the contour features of each workpiece W (step S4).

Specifically, the three classified large groups are set for each workpiece W, and information about the workpieces W classified into the "large" large group is sent to the most upstream robot 4; information about the workpieces W classified into the "medium" large group is sent to the second robot 5 counted from the most upstream side; and information about the workpieces W classified into the "small" large group is distributed to the two robots 6 and 7 located downstream (step S5).

At this point, only the large group is set to each workpiece W, and no small group is set to each workpiece W.

Next, processes of the robots 4, 5, 6, and 7 will be described.

The processes of the robots 4, 5, 6, and 7 vary depending on whether or not the robot is the most downstream robot 7. Accordingly, as illustrated in FIG. 6, it is determined whether or not the robot is the most downstream robot 7 (step S6).

Since the most downstream robot 7 does not include the weight scale 12, the robot 7 ejects, from the workpiece conveying conveyor 2, the workpieces W for which the "small" large group allocated to the robot 7 is set, in order from the most downstream side, without measuring the weight of each workpiece (step S7), and sorts the workpieces W to the sorting destination conveyor 18 for the small group "SS" as the sorting destination (step S8).

At this time, the control part 8 controls the robot 7 to dispose the hand 11 at a position where the workpieces W conveyed by the workpiece conveying conveyor 2 can be gripped, while controlling the visual tracking part to cause the robot 7 to follow the operation of the workpiece conveying conveyor 2, based on the image captured by the camera 3 and the information about the conveying position obtained from the encoder 10 of the workpiece conveying conveyor 2. The same holds true for the other robots 4, 5, and 6.

In step S6, when it is determined that the robot is not the most downstream robot 7, the robot ejects the workpieces W for which the large group allocated to the robots 4, 5, and 6 is set, from the workpiece conveying conveyor 2 in order from the most downstream side. At this time, it is determined whether or not small groups are set to the workpieces W to be ejected (step S9). When small groups are set to the workpieces W to be ejected, the robots 4, 5, and 6 sort the workpieces W to the sorting destination conveyors 13, 14, 15, 16, and 17 respectively corresponding to the set small groups 3L, 2L, L, M, and S without measuring the weight of each workpiece W (step S10).

In step S9, when it is determined that small groups are not set, the robots 4, 5, and 6 cause the hand 11 to grip the workpieces W for which the allocated large group is set, and slightly lift the workpieces W from the workpiece conveying conveyor 2 (step S11), thereby measuring the weight of each workpiece W by the weight scale 12 (step S12). When the weight of each workpiece is measured, small groups are set to the respective workpieces W (step S13).

For example, the "large" large group is allocated to the most upstream robot 4, and the "large" large group includes the small groups "3L" and "2L". Accordingly, the workpieces W classified into the "large" large group based on the image captured by the camera 3 are workpieces that should be sorted into the small group of "3L" or "2L" in many cases. However, since the classification of the large group is performed based on the image, the workpieces W may not belong to the "large" large group. The same holds true for the other robots 5 and 6.

Figure 7:
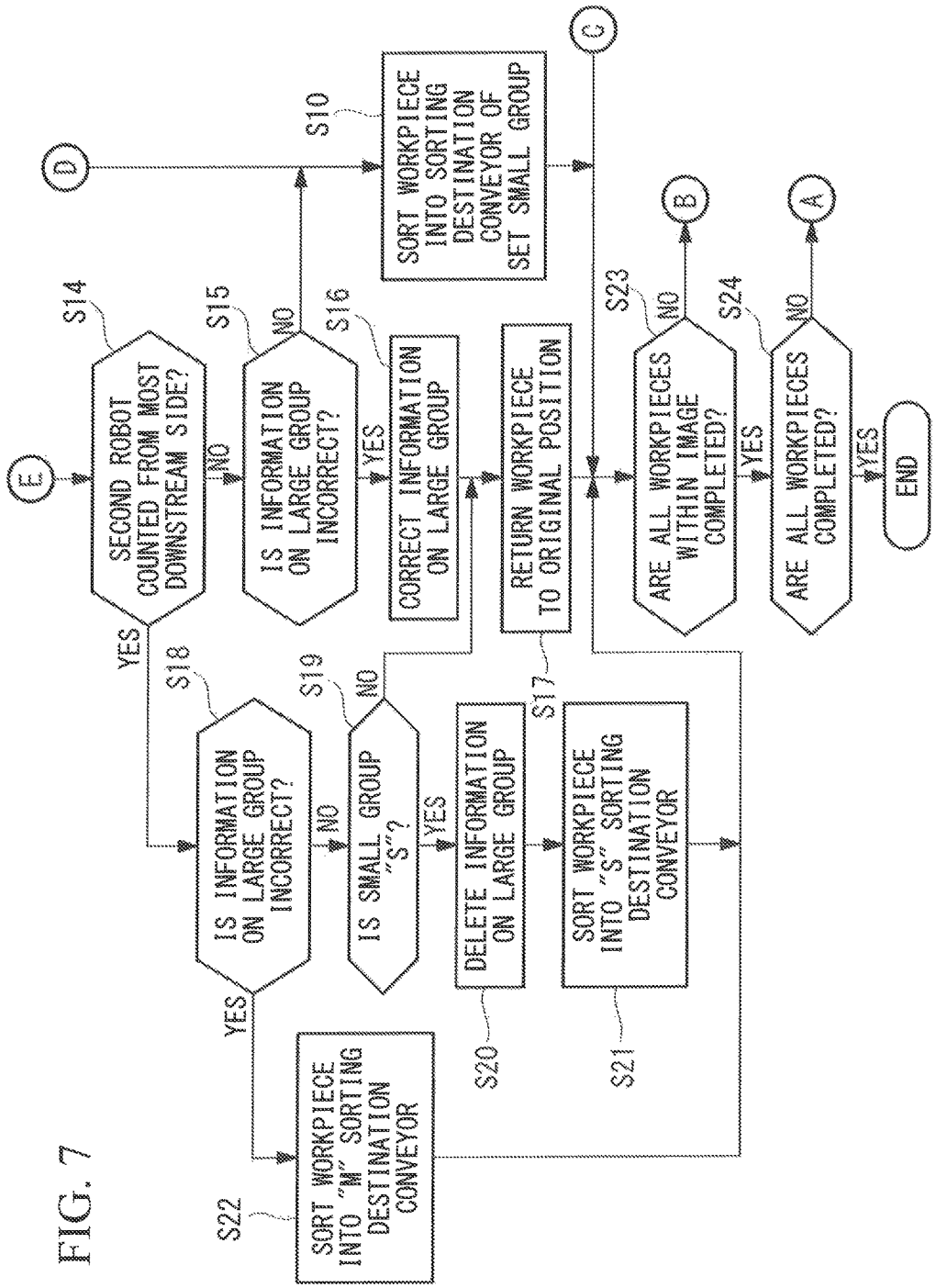
FIG. 7 is a flowchart that follows the flowchart illustrated in FIG. 6.

Next, as illustrated in FIG. 7, it is determined whether or not the robot is the second robot 6 counted from the most downstream side (step S14), and when it is determined that the robot is not the second robot 6 counted from the most downstream side, that is, when the robot is one of the two robots 4 and 5 located upstream in this embodiment, it is determined whether or not information about the large group set for the workpieces W picked out from the workpiece conveying conveyor 2 by the robots 4 and 5 is incorrect as a result of weight measurement (step S15).

In step S15, when it is determined that the information about the large group is correct, the workpieces W is sorted to the sorting destination conveyers 13, 14, 15, and 16 corresponding to the small groups set in step S13 (step S10).

On the other hand, in step S15, when it is determined that the information about the large group is incorrect, the information about the large group set for the workpiece W is corrected (step S16), and the visual tracking part returns the workpiece W to the original position on the workpiece conveying conveyor 2 where the workpieces W is previously located before being ejected (step S17).

Further, when it is determined that the robot is the second robot 6 counted from the most downstream side in step S14, it is determined whether or not the information about the large group set for the workpiece W is incorrect (step S18), and when the information about the large group is correct, it is determined whether or not the small group is "S" (step S19). When the small group is "S", the information about the large group is deleted (step S20), and the workpiece W is sorted to the sorting destination conveyor 17 corresponding to the small group "S" (step S21).

On the other hand, in step S19, when it is determined that the small group is not "S", but "SS", the visual tracking part returns the workpieces W to the original position on the workpiece conveying conveyor 2 where the workpiece W is previously located before being ejected (step S17).

Further, in step S18, when it is determined that the information about the large group is incorrect, the workpiece W is sorted to the sorting destination conveyor 16 of the small group "M" shared by the second robot 5 counted from the most upstream side (step S22).

Further, it is determined whether or not sorting of all the workpieces W within the image is completed (step S23), and when the sorting is not completed, the process from step S6 is repeated. When sorting of all the workpieces W within the image is completed, it is determined whether or not sorting of all the workpieces W on the workpiece conveying conveyor 2 is completed (step S24), and when the sorting is not completed, the process from step S1 is repeated.

Thus, according to the workpiece sorting system 1 and the workpiece sorting method of this embodiment, the workpieces are instantaneously and roughly classified into a plurality of large groups based on the image captured by the camera 3, and the plurality of robots 4, 5, 6, and 7 to which the large groups are allocated can accurately sort the workpieces W into the plurality of small groups 3L, 2L, L, M, S, and SS by weight measurement. This provides an advantage that the workpieces W can be efficiently sorted according to the weight of each workpiece, even when a large number of various types of workpieces W are conveyed by the workpiece conveying conveyor 2 at a high speed.

The number of types of workpieces to be sorted by one robot is reduced, so that the number of the sorting destination conveyors 13, 14, 15, 16, and 17 as sorting destinations can be reduced and space saving can be achieved.

In particular, in the case of sorting six types of workpieces W, when all the robots 4, 5, 6, and 7 sort the six types of workpieces, the workpieces W of the same type are sorted into six different sorting destinations, which requires a large space. However, according to this embodiment, the workpieces W of the same type can be sorted into the same sorting destination and thus the number of sorting destinations can be minimized. Since the number of sorting destinations is reduced, collection of the sorted workpieces W can be facilitated.

Even if the large group classified according to the area of each workpiece W that is obtained from the image is improper, the workpiece can be sorted to the proper sorting destination by the downstream side robots 5, 6, and 7 by returning the workpiece to the same position on the workpiece conveying conveyor 2.

Further, since the two robots 5 and 6 share the sorting destination conveyor 16, the workpieces W can be sorted into the proper sorting destination even if it turns out that the classification of the large group for the downstream side robot 6 is improper.

While this embodiment illustrates the case where the most downstream robot 7 does not include the weight scale 12, the three robots 4, 5, and 6 each including the weight scale 12 may sort two workpieces at a time to the sorting destination.

The number of robots may be arbitrarily selected according to the type of the workpieces W.

While agricultural products having various shapes, such as sweet potatoes, are illustrated as the workpieces W, the workpieces W are not limited to these products. Any workpieces may be applied as long as the workpieces have a certain relationship between the contour features based on the image and the weight of each workpiece.

Six-axis articulated type robots are illustrated as the robots 4, 5, 6, and 7, the robots are not limited to these robots.

The contour features of each workpiece W are extracted from the image captured by the camera 3, and the position of center of gravity of each workpiece W is calculated. Thus, since the visual tracking part causes the robots 5, 6, and 7 to follow and grip the workpieces W on the workpiece conveying conveyor 2, when the information about the large group is incorrect, the workpiece can be accurately returned to its original position.

Alternatively, when it is necessary to recognize the posture of each workpiece W so as to grip the workpiece W by the hand 11, not only the position of center of gravity of each workpiece W, but also the posture of the workpiece W may be calculated. As a result, even when the information about the large group is incorrect and the ejected workpiece W is returned to its original position, the workpiece W can be returned to its original position with its original posture, thereby facilitating gripping of the workpiece by the hand 11 of each of the robots 5, 6, and 7 located downstream.

From the above-described embodiment, the following invention is derived.

According to one aspect of the present invention, provided is a workpiece sorting system including: a conveyor configured to randomly convey various types of workpieces having different weights; a conveying position detection part configured to detect a conveying position of each of the workpieces conveyed by the conveyor; a camera configured to photograph the workpieces conveyed by the conveyor; a plurality of robots disposed along a conveying direction of the conveyor, each of the robots being provided with a hand capable of ejecting the workpieces on the conveyor and a weight measurement part configured to measure a weight of each of the workpieces ejected by the hand; a control part configured to control each of the robots; and a large group classifying part configured to classify the workpieces into two or more large groups based on an image of the workpieces captured by the camera, the large groups being allocated to the robots. The control part includes a visual tracking part configured to cause each of the robots to handle the workpieces, while causing each of the robots to follow an operation of the conveyor, based on the image of the workpieces captured by the camera and the conveying position of each of the workpieces detected by the conveying position detection part. The control part controls the visual tracking part to cause the workpieces classified into the large groups allocated to the robots to be ejected from the conveyor by the hand, and controls so that, based on the weight measured by the weight measurement part, the workpieces are sorted for each of small groups respectively included in the large groups.

According to this aspect, various types of workpieces having different weights and conveyed randomly by the conveyor are photographed by the camera, so that the workpieces are classified into two or more groups based on the captured images and the large groups are allocated to any one of the robots arranged in the conveying direction of the conveyor. Each robot ejects, by the hand, the workpieces classified into the large group allocated to the robot from the conveyor, while the visual tracking part follows the workpieces, and the weight of each of the workpieces is measured by the weight measurement part. Further, the control part controls each robot, based on the measured weight, to sort the workpieces for each small group included in the large group allocated to the robot.

Specifically, the workpieces are sorted into a plurality of large groups according to the contour of each workpiece included in the image captured by the camera. The workpieces classified into the large group allocated to the robot are ejected from the conveyor, and the weight of each of the workpieces is measured, so that the workpieces can be sorted into one or more small groups with high accuracy according to the measured weight.

In this case, it is only necessary for each robot to eject only the workpieces classified into the large group allocated to the robot and sort the workpieces. Accordingly, there is no need for all robots to sort the workpieces in all small groups. Therefore, the number of sorting destinations for each robot can be reduced and an increase in size of the system can be prevented.

Further, since each robot sorts the workpieces belonging to different large groups, the number of sorting destinations of the workpieces belonging to the respective small groups can be reduced.

Furthermore, it is sufficient for each robot to handle only some of the workpieces classified by the large group classifying part, the workpieces can be efficiently sorted according to the weight of each workpiece, even when a large number of various types of workpieces are conveyed by a conveyor at a high speed.

In the above-mentioned aspect, the control part may control the large group to which the workpiece belongs to be corrected when the workpiece whose weight is measured by the weight measurement part of each of the robots is determined to belong to the large group allocated to other robots located downstream in the conveying direction, and may control the visual tracking part to cause the robot that has ejected the workpiece to return the workpiece to an original position of the workpiece on the conveyor.

When the large group is improperly classified according to the contour of the workpiece included in the image, it turns out that the classification of the large group for the workpiece is improper only after the workpiece is ejected from the conveyor by the robot to which the large group classified for the workpiece is allocated and the weight of the workpiece is measured.

Thus, when the classification of the large group for the workpiece is improper, the large group to which the workpiece belongs is corrected and the workpiece is returned to the original position on the conveyor from which the workpiece has been ejected. Consequently, the robots located downstream can be caused to sort the workpiece into a proper small group.

In the above-mentioned aspect, the control part may control the other robots in such a manner that, when the large group to which the workpiece belongs is corrected, the small group of the workpiece is set for the workpiece based on the weight measured by the weight measurement part, and the workpiece is sorted to the set small group when the small group is set for the workpiece belonging to the large group allocated to the other robots located downstream.

With this structure, the weight of the workpiece is already measured when it turns out that the classification of the large group for the workpiece is improper. Accordingly, a proper small group can be set, and the other robots located downstream can sort the workpiece to the set small group, without the need for performing any processing, such as weight measurement, when the small group is set for the workpiece ejected from the conveyor, thereby simplifying the process and achieving high-speed processing.

In the above-mentioned aspect, the control part may control the visual tracking part to cause the robot that has ejected the workpiece to return the workpiece to an original position of the workpiece on the conveyor with an original posture of the workpiece.

With this structure, not only the position of each workpiece, but also the posture of each workpiece can be obtained from the image captured by the camera. Accordingly, the workpiece is returned to the conveyor with the original posture of the workpiece, thereby facilitating the ejection of the workpiece, which requires the workpiece to change the posture, from the conveyor by the hand depending on the posture of the workpiece.

In the above-mentioned aspect, the two large groups allocated to the robots adjacent to each other in the conveying direction of the conveyor may include a common small group.

With this structure, when a large number of workpieces belong to a particular small group among the workpieces conveyed by the conveyor, the workpieces belonging to the small group can be handled by the plurality of robots, which leads to an increase in processing speed. Further, even if the workpiece to be classified into the large group allocated to a robot located upstream is improperly classified to the large group allocated to a robot located downstream, the robot located downstream can sort the workpiece.

In the above-mentioned aspect, the common small group may be allocated to a common carrying-out destination.

With this structure, even when the common small group is handled by the plurality of robots, the number of carrying-out destinations can be reduced and space saving can be achieved.

The robot that is provided with the hand and does not include the weight measurement part may be disposed most downstream in the conveying direction of the conveyor.

With this structure, the workpiece which has not been sorted by the robot located upstream can be sorted by the robot located most downstream to one sorting destination without the need for measuring the weight of the workpiece.

According to another aspect of the present invention, provided is a workpiece sorting method including the steps of: photographing various types of workpieces having different weights, the workpieces being randomly conveyed by a conveyor; classifying the workpieces into two or more large groups based on an image of the workpieces captured by photographing; measuring a weight of each of the workpieces by causing a plurality of robots disposed along a conveying direction of the conveyor to eject the workpieces classified into the large groups allocated to the respective robots, while causing the robots to follow an operation of the conveyer based on the images and a conveying position of the conveyor; and causing each of the robots to sort the workpieces for each small group included in the large group allocated to the robot, based on the measured weight.

In the above-mentioned aspect, when the workpiece whose weight is measured in the step of measuring the weight is determined to belong the large group allocated to other robots located downstream in the conveying direction, the large group to which the workpiece belongs may be corrected and the robot that has ejected the workpiece may be caused to return the workpiece to an original position of the workpiece on the conveyor.

In the above-mentioned aspect, when the large group to which the workpiece belongs is corrected, the small group of the workpiece may be set for the workpiece based on the measured weight, and the other robots may be caused to sort the workpiece to the set small group when the small group is set for the workpiece belonging to the large group allocated to the other robots located downstream.

In the above-mentioned aspect, the robot that has ejected the workpiece may be caused to return the workpiece to an original position of the workpiece on the conveyor with an original posture of the workpiece.

REFERENCE SIGNS LIST

1 Workpiece sorting system
2 Workpiece conveying conveyor (conveyor)
3 Camera
4, 5, 6, 7 Robot
8 Control part
9 Large group classifying part
10 Encoder (conveying position detection part)
11 Hand
12 Weight scale (weight measurement part)
13, 14, 15, 16, 17 Sorting destination conveyor (carrying-out destination)
3L, 2L, L, M, S, SS Small groups
W Workpiece

The invention claimed is:

1. A workpiece sorting system comprising:
   a conveyor configured to randomly convey various types of workpieces having different weights;
   a conveying position detection part configured to detect a conveying position of each of the workpieces conveyed by the conveyor;
   a camera configured to photograph the workpieces conveyed by the conveyor;
   a plurality of robots disposed along a conveying direction of the conveyor, each of the robots being provided with a hand capable of ejecting the workpieces on the conveyor and a weight measurement part configured to measure a weight of each of the workpieces ejected by the hand;
   a controller configured to control each of the robots; and
   a large group classifying part configured to classify the workpieces into two or more large groups based on a contour feature of an image of the workpieces captured by the camera, the large groups being allocated to the robots,
   wherein the controller includes
      a visual tracking part configured to cause each of the robots to handle the workpieces, while causing each of the robots to follow an operation of the conveyor, based on the image of the workpieces captured by the camera and the conveying position of each of the workpieces detected by the conveying position detection part,
      a hand controller configured to control the hand using the visual tracking part so as to eject the workpieces classified into the large groups allocated to the robots from the conveyer, and
      a workpiece sorting part configured to sort the workpieces based on the weight measured by the weight measurement part for each of small groups respectively included in the large groups.

2. The workpiece sorting system according to claim 1, wherein the controller is configured to perform control so as to correct the large group to which the workpiece belongs when the workpiece whose weight is measured by the weight measurement part of each of the robots is determined to belong to the large group allocated to other robots located downstream in the conveying direction, and is configured to perform control using the visual tracking part so as to cause the robot that has ejected the workpiece to return the workpiece to an original position of the workpiece on the conveyor.

3. The workpiece sorting system according to claim 2, wherein the controller is configured to control the other robots in such a manner that, when the large group to which the workpiece belongs is corrected, the small group of the workpiece is set for the workpiece based on the weight measured by the weight measurement part, and the workpiece is sorted to the set small group when the small group is set for the workpiece belonging to the large group allocated to the other robots located downstream.

4. The workpiece sorting system according to claim 2, wherein the controller is configured to perform control using the visual tracking part so as to cause the robot that has ejected the workpiece to return the workpiece to an original position of the workpiece on the conveyor with an original posture of the workpiece.

5. The workpiece sorting system according to claim 1, wherein the two large groups allocated to the robots adjacent to each other in the conveying direction of the conveyor include a common small group.

6. The workpiece sorting system according to claim 5, wherein the common small group is allocated to a common carrying-out destination.

7. The workpiece sorting system according to claim 1, wherein the robot that is provided with the hand and does not include the weight measurement part is disposed most downstream in the conveying direction of the conveyor.

8. The workpiece sorting system according to claim 1, wherein the contour feature is selected from a group consisting of an area, a perimeter, a major-axis length, a minor-axis length, an aspect ratio, and combinations thereof.

9. The workpiece sorting system according to claim 1, wherein the visual tracking part is configured to obtain coordinates of a predetermined position of each of the workpieces on the conveyor with respect to a reference position on the conveyor at the moment, based on the image captured by the camera.

* * * * *